July 21, 1931. S. MIYAGI 1,815,521
APPARATUS FOR SETTING SEED SHELL FISH
Filed April 23, 1930

Inventor
Shinsho Miyagi
By Thomas H. Ferguson
Attorney

Patented July 21, 1931

1,815,521

UNITED STATES PATENT OFFICE

SHINSHO MIYAGI, OF TOKYO, JAPAN

APPARATUS FOR SETTING SEED SHELLFISH

Application filed April 23, 1930, Serial No. 446,564, and in Japan April 24, 1929.

The present invention relates to apparatus for setting seed shell fish, such as oysters, clams, and the like.

In apparatus of this kind heretofore in use, there is a supporting frame for the elements which carry the compound in which the seed shell fish are lodged but the frame is kept above the water level by floats and consequently sea weed and other objectionable growths and materials gather about these elements and foul them and greatly limit the lengths available for the seed fish. Furthermore, the frame is rocked by the waves and the resulting agitation causes many of the seed fish on the compound carrying elements to drop off and thus winds and waves interfere with effective planting of the seed fish.

The principal object of the present invention is to produce an apparatus of this class which will be free of these objections.

To this end I arrange the rope-supporting frame so that it is kept at a suitable depth in the water. In this way the undesirable effect of the winds and waves is reduced and the length of the compound carrying elements available for seed carrying service is increased. Thus more seed can be planted without increasing the size of the frames.

These and other features and advantages of my invention will be more fully understood upon reference to the following detailed description taken in connection with the accompanying drawings wherein a preferred embodiment of the invention is disclosed, while reference should be had to the appended claims for a measure of the scope of the invention.

Figure 1:
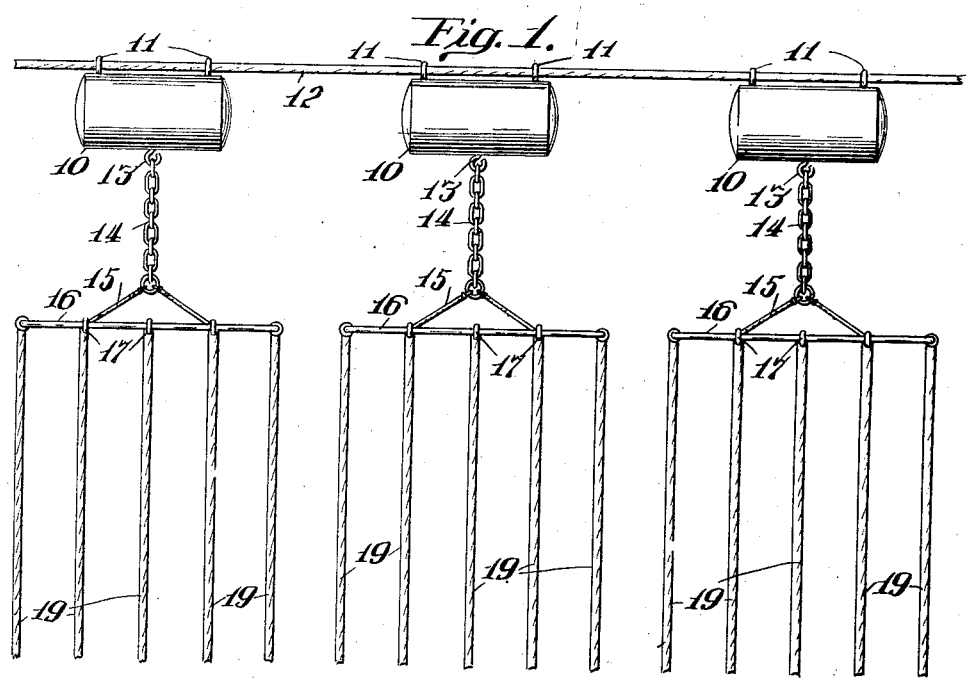
Figure 2:
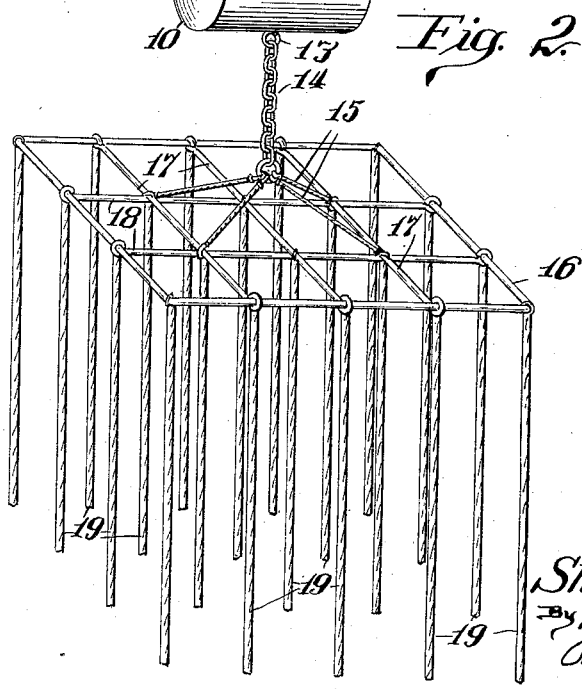

In said drawings, Fig. 1 is an elevation of a series of apparatus constructed and arranged in accordance with my invention, and Fig. 2 is a perspective view of one of these apparatuses upon a slightly larger scale showing to better advantage the depending compound holding elements. In both of these views, like characters refer to like parts.

Referring to said drawings in detail, 10 designates the floats on the top of each of which is a plurality of rings 11 or like attaching means through which extends the supporting cable or line 12. On the under side of each float 10 is a ring or hanger 13 from which a weighted flexible element, such as a chain 14, depends. From the lower end of the chain there diverge three or more strands 15 which are connected at their outer ends to the frame 16 at separated points preferably equidistant from the center of the frame. The frame 16 may be variously made but preferably it includes two sets of members 17 and 18 positioned at right angles to each other and spaced and connected together as shown so as to present little resisting surface to water when lowered into it. Preferably the members 17 and 18 are stout wires welded or otherwise secured together at intersecting and connecting points. At these points I preferably secure the depending elements 19 which carry the compound in which the seed shell fish are lodged. These elements 19 are preferably fiber strings or ropes, although they might be variously composed. And, obviously, these elements 19 might be attached to the frame 16 at other points than those shown.

Ordinarily a number of the setting apparatuses will be put on the line 12. This is indicated in Fig. 1 where three such apparatuses are shown but, obviously, this number might be greatly increased. The ends of this cable or line 12 may be secured in any desired way, to posts, floats having anchors, and in other ways which will readily suggest themselves.

In operation, the floats 10 ride upon the surface of the water and the frames 16 and the seed bearing elements 19 are far down in the water. Consequently, there is little movement of the elements 19 even though the floats 10 may be moved considerably. This is especially true where the chains 14 are long as may be the case in many instances of use. Because of the deep location of the seed carrying elements 19 there is little loss of the seed shell fish. This is in decided contrast to those practices where these elements are partly above the water level. Furthermore, in my arrangement, all the elements 19 may be used throughout their entire lengths to carry the seed.

Obviously, by varying the lengths of the chains 14, the setting elements 19 may be kept in a position most suitable for setting the particular shell fish in hand, whether oysters or other mollusks, and at the same time the waste and breaking of the elements 19, whether flexible or not, may be prevented to a large degree, because they, being completely immersed in the water, are not exposed to air which in the case of some material used for this purpose causes them to deteriorate quickly.

In practice, the compound which I employ on the seed supporting elements is preferably a mixture of coal tar and pitch. This compound is sufficiently tenacious to hold the seed mollusks pressed into and otherwise attached to it so as to prevent a waste of seed in the sea, and yet sufficiently detachable from the supporting element to properly and satisfactorily plant the seed.

What I claim as new and desire to secure by a patent of the United States is:

1. Apparatus of the class described comprising a float, a ring on the upper side of said float through which a supporting line may be passed, a ring on the under side of said float, a chain secured at one end to said last mentioned ring, a frame secured to the lower end of said chain, and a number of flexible ropes secured at their upper ends to different points of said frame and adapted to depend from said frame in the water and to carry the seed supporting compound.

2. Apparatus of the class described comprising a float, means on the upper side of said float by which the same may be movably strung upon a supporting line, a heavy flexible element secured to the under side of said float and adapted to depend therefrom, a frame secured at a plurality of points to said heavy element so as to extend substantially horizontally in the water, and a number of flexible elements hung from said frame so as to depend in the water, said latter elements being adapted to receive a retaining compound for holding the seed shell fish.

SHINSHO MIYAGI.